US009691416B1

United States Patent
Izawa et al.

(10) Patent No.: US 9,691,416 B1
(45) Date of Patent: Jun. 27, 2017

(54) MICROWAVE ASSISTED MAGNETIC RECORDING HEAD WITH TRAILING SHIELD HEAT SINK

(71) Applicant: HGST Netherlands B.V., Amsterdam (NL)

(72) Inventors: Takahiko Izawa, Ota (JP); Hideaki Tanaka, Odawara (JP); Yoshinori Takeuchi, Ishioka (JP)

(73) Assignee: Western Digital Technologies, INC., Irvine, CA (US)

( * ) Notice: Subject to any disclaimer, the term of this patent is extended or adjusted under 35 U.S.C. 154(b) by 0 days.

(21) Appl. No.: 15/132,155

(22) Filed: Apr. 18, 2016

(51) Int. Cl.
G11B 5/127 (2006.01)
G11B 5/39 (2006.01)
G06F 1/20 (2006.01)

(52) U.S. Cl.
CPC .............. *G11B 5/3909* (2013.01); *G06F 1/20* (2013.01); *G11B 5/127* (2013.01)

(58) Field of Classification Search
CPC .................................. G11B 5/127; G11B 5/40
USPC ......................................... 360/125.3–125.33
See application file for complete search history.

(56) References Cited

U.S. PATENT DOCUMENTS

| 8,320,079 | B2 | 11/2012 | Iwasaki et al. |
| 8,693,142 | B2 | 4/2014 | Chen et al. |
| 8,760,779 | B2 | 6/2014 | Johns et al. |
| 8,995,088 | B1 | 3/2015 | Boone et al. |
| 9,153,274 | B2 | 10/2015 | Ajioka |
| 2001/0017820 | A1* | 8/2001 | Akiyama ............... B82Y 10/00 369/13.01 |
| 2005/0243464 | A1* | 11/2005 | Lille ..................... G11B 5/3113 360/125.72 |
| 2008/0259493 | A1* | 10/2008 | Kief .................... G11B 5/1278 360/119.01 |
| 2009/0109570 | A1* | 4/2009 | Scholz ................ G11B 5/1278 360/129 |
| 2011/0090596 | A1* | 4/2011 | Franca-Neto ........ G11B 5/1278 360/125.03 |
| 2011/0132457 | A1* | 6/2011 | Finot ........................ F24J 2/07 136/259 |
| 2013/0016591 | A1* | 1/2013 | Tomikawa ............. G11B 5/314 369/13.02 |
| 2015/0092292 | A1 | 4/2015 | Furukawa et al. |
| 2016/0217816 | A1* | 7/2016 | Sayama ................... G11B 5/65 |

FOREIGN PATENT DOCUMENTS

WO 2015126326 A1 8/2015

\* cited by examiner

*Primary Examiner* — Allen T Cao
(74) *Attorney, Agent, or Firm* — Zilka-Kotab, P.C.

(57) ABSTRACT

A magnetic write head having a heat sink structure located adjacent to a trailing magnetic shield. The heat sink structure prevents heat generated by the magnetic oscillator current from causing damage to and reducing reliability of the magnetic write head. The trailing magnetic shield is substantially aligned with the magnetic oscillator, allowing the heat sink structure to wrap around the sides and back of the trailing magnetic shield and to provide good heat conduction away from the write pole, magnetic oscillator and trailing magnetic shield. The heat sink structure can be constructed of a material such as Ru, TiN, Cu, Au, Ag and AlN, and is preferably constructed of Au, which has excellent thermal properties.

18 Claims, 12 Drawing Sheets

| Material | Thermal conductivity KXX pW/um°C | Specific heat C pJ/kg°C | Mass density DENS kg/um**3 | The average coefficient of linear expansion ALPX /°C | Young's modulus EX Mpa uN/um^2 | Poisson rate PRXY |
|---|---|---|---|---|---|---|
| STO | Spin Torque Oscillator | | | | | - |
| TS/SS | $Ni_{45}Fe_{54}$ | 2.50E+07 | 4.00E+14 | 8.70E-15 | 1.20E-05 | 2.00E+05 | 0.3 |
| MP | $Ni_{80}Fe_{20}$ | 2.50E+07 | 4.00E+14 | 8.70E-15 | 8.00E-06 | 2.00E+05 | 0.3 |
| Cu(HS) | Copper | 2.50E+07 | 4.00E+14 | 8.70E-15 | 1.20E-05 | 2.00E+05 | 0.3 |
| Au(HS) | Gold | 4.00E+08 | 4.00E+14 | 8.90E-15 | 1.70E-05 | 1.20E+05 | 0.33 |
| AlOx | Alumina | 6.00E+08 | 2.38E+14 | 1.25E-14 | 6.40E-06 | 4.47E+05 | 0.3 |
| Altic(N58) | Altic | 1.50E+06 | 6.70E+14 | 3.90E-15 | 6.50E-06 | 1.30E+05 | 0.25 |
| | | 2.48E+07 | 8.00E+14 | 4.20E-15 | 6.90E-06 | 3.80E+05 | 0.3 |

FIG. 12

MICROWAVE ASSISTED MAGNETIC RECORDING HEAD WITH TRAILING SHIELD HEAT SINK

FIELD OF THE INVENTION

The present invention relates to magnetic data recording and more particularly to a microwave assisted magnetic recording head having a trailing shield heat sink structure for dissipating heat produced by electrical current flowing through a spin torque oscillator.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft under-layer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

SUMMARY

The present invention provides a magnetic write head that includes a magnetic write pole, a trailing magnetic shield and a magnetic oscillator located between the trailing magnetic shield and the write pole. A heat sink structure is formed adjacent to the trailing magnetic shield so as to conduct heat away from the trailing magnetic shield.

The trailing magnetic shield can be formed with a columnar shape that has first and second laterally opposed sides and a back side that is opposite the media facing surface, and wherein the first and second sides and back side are all substantially aligned with the magnetic oscillator. The heat sink structure can be constructed of a material having a thermal conductivity of at least 4.0 E+08 pWum° C. such as Ru, TiN, Cu, Au, Ag or AlN and is preferably constructed of Au, which has good thermal conductivity.

The heat sink structure, located adjacent to the trailing magnetic shield advantageously conducts heat away from the trailing magnetic shield and also from the magnetic oscillator and write pole while also allowing the write pole to be properly insulated by a non-magnetic, electrically insulating side gap material.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIGS. 5a-11b are cross sectional views of a portion of a magnetic write head in various intermediate stages of manufacture, illustrating a method of manufacturing a magnetic write head with a heat sink structure that wraps around a columnar trailing shield structure.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
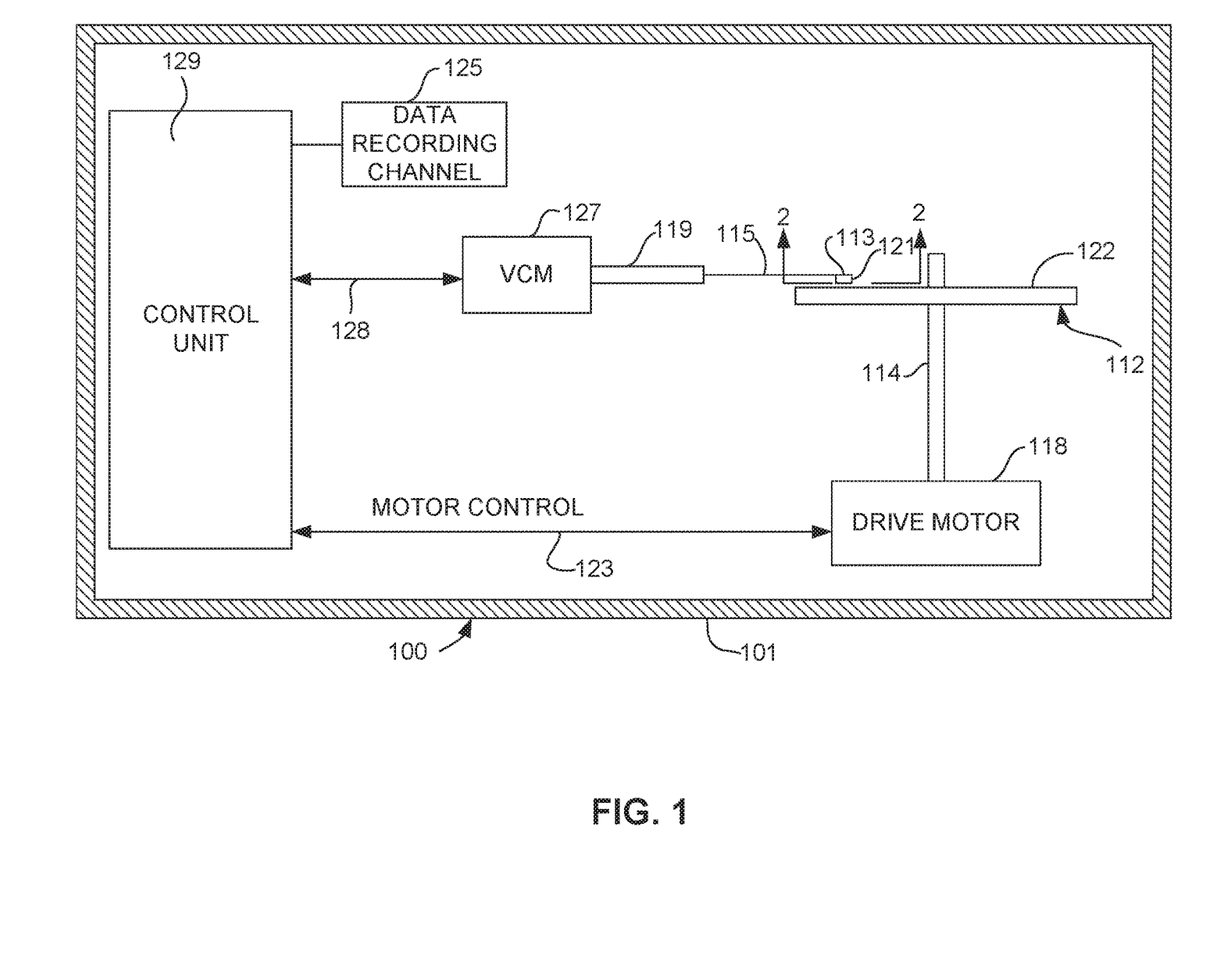
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 of and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
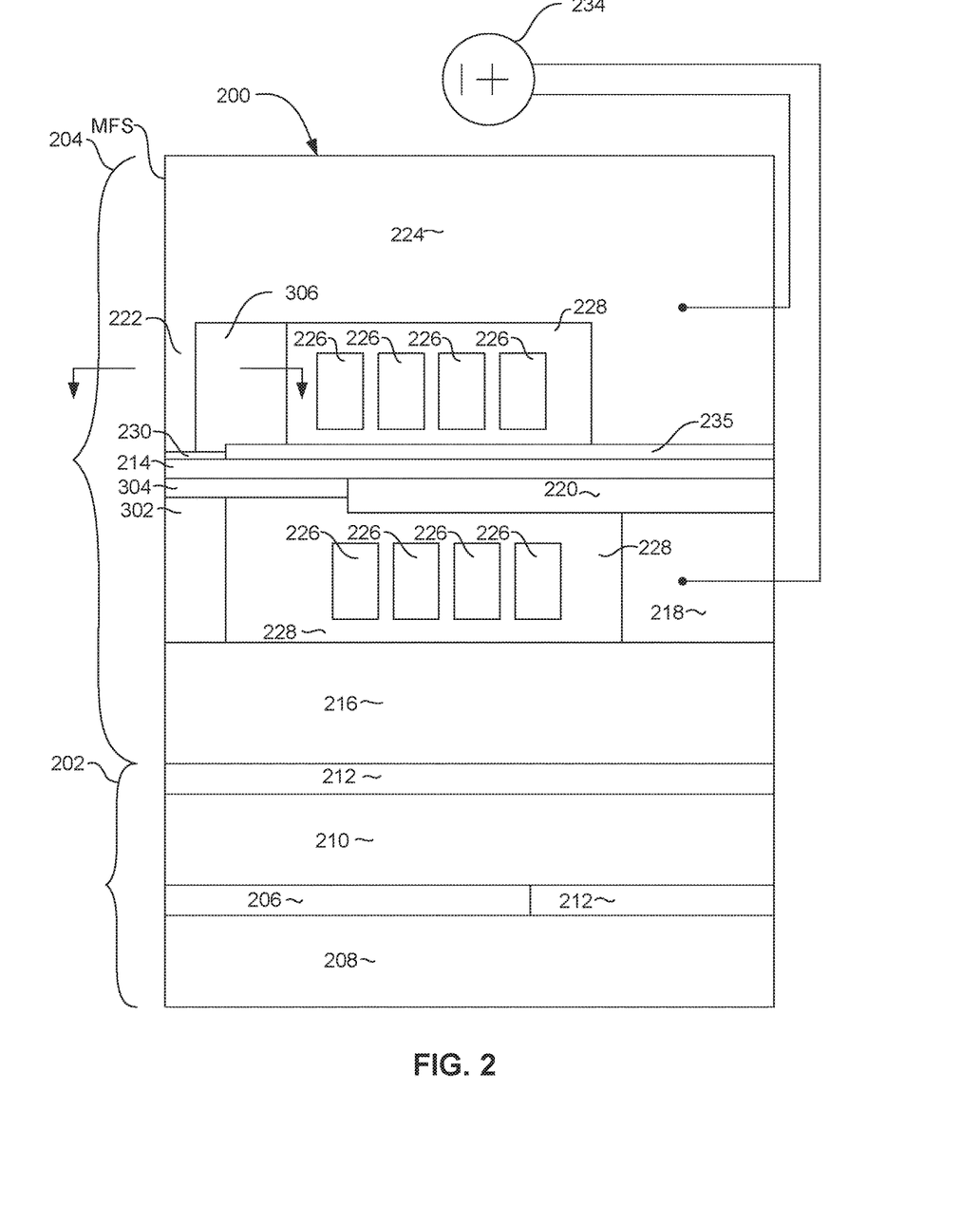
FIG. 2 is a is a side cross sectional view of a magnetic head for use in a magnetic data recording system.

FIG. 2 shows a side, cross sectional view of a magnetic head 200 that includes a read head 202 and a write head 204. The read head 202 can include a magnetic sensor 206 such as a giant magnetoresistive (GMR) sensor or tunneling magnetoresistive (TMR) sensor that can be sandwiched between lower and upper magnetic shields 208, 210. The space between the read head 202 and write head 204 can be filled with a non-magnetic, electrically insulating material such as alumina 212, as can the space between the shields 210, 208 behind the read sensor 206.

The write head 204 can include a magnetic write pole 214 that can extend to a media facing surface MFS. The magnetic write head 204 can also include a magnetic return pole 216 that can be magnetically connected with the write pole 214 at a region removed from the media facing surface MFS by a magnetic back gap layer 218 and optional magnetic shaping layer 220. A magnetic trailing shield 222 can be located at the media facing surface MFS near the trailing edge of the write pole 214, and can be connected with the back portion of the write head 204 by a trailing magnetic return pole 224. The trailing magnetic shield 222 can be separated from the trailing edge of the write pole 214 by a magnetic oscillator 230 that will be discussed in greater detail herein below.

A non-magnetic, electrically conductive write coil 226, shown in cross section in FIG. 2, can pass above and below the write pole 214. The write coil 226 can be embedded in an electrically insulating, non-magnetic material such as alumina 228. When an electrical current flows through the write coil 226 the resulting magnetic field causes a magnetic flux to flow through the write pole 214. This results in a magnetic write field being emitted from the tip of the magnetic write pole 214, The write field travels though the magnetic media (not shown in FIG. 2) and then returns to the return pole 216 and the trailing magnetic return pole 224. Because the return poles 216, 224 have a much larger cross section at the media facing surface MFS than does the write pole 214, the magnetic write field returning to the return poles 216, 224 does not erase the previously recorded bit.

As higher data density requirements require ever smaller recorded bits of data, the magnetic bits become inherently unstable. In order to make the bits more stable, the magnetic media can be constructed to have a higher magnetic anisotropy. However, this increase in magnetic anisotropy also makes the media harder to write to, requiring larger magnetic write field strength. The necessarily smaller size of the write pole 214 exacerbates this problem by making it even harder to generate a sufficiently strong magnetic write field.

One way to overcome this dilemma is through the use of microwave assisted magnetic recording (MAMR) A magnetic layer in the magnetic oscillator 230 oscillates its magnetization by the feeding of current there-through and generates a high frequency magnetic field. This high frequency magnetic field temporarily lowers the magnetic anisotropy of the magnetic media making it easier to write to with less magnetic write field. An electrical current can be supplied to the magnetic oscillator in order to cause the magnetic oscillator 230 to generate its magnetization's oscillation and the high frequency magnetic field. This electrical current can be supplied by circuitry 234 that can be electrically connected with, for example, the magnetic return pole 224 and back gap layer 218. An electrically insulating layer 235 can be provided at the back portion of the write head 204 to prevent the electrical current from being shunted through the back of the write head 204. Therefore, the electrical current flows through the write pole 214 and through the magnetic oscillator 230 to the trailing magnetic shield 222.

One challenge that arises as a result of the use of the magnetic oscillator 230 is that the electrical current flowing through the magnetic oscillator 230, as well as the write pole 214, and trailing magnetic shield 222 heats up these structures. Heating of the write pole 214 results in performance degradation, such as that due to oxidation of the write pole 214. In addition, this heating can result in removal of the carbon overcoat (not shown) that is used to protect the slider during operation. This removal of the carbon overcoat greatly reduces the lifespan of the magnetic data recording system.

One way to prevent such heating is by providing a heat sink structure. A heat sink structure is a structure that is constructed of a thermally conductive material that can conduct heat away from the write pole 214, spin torque oscillator 230 and trailing magnetic shield 222. While it might seem desirable to place such a heat sink structure at the sides of the write pole 214, other necessary structure around the write pole make the use of such a heat sink structure problematic and inefficient. For example, a non-magnetic side shield material is desired to prevent adjacent track interference, and an electrically insulating, non-magnetic side wall is needed to separate the write pole 214 from the side shield, in order to allow the write pole 214 to function properly and also to allow the current to flow from the write pole 214 to through the spin torque oscillator 230 without being shunted through the magnetic side shields.

Figure 3:
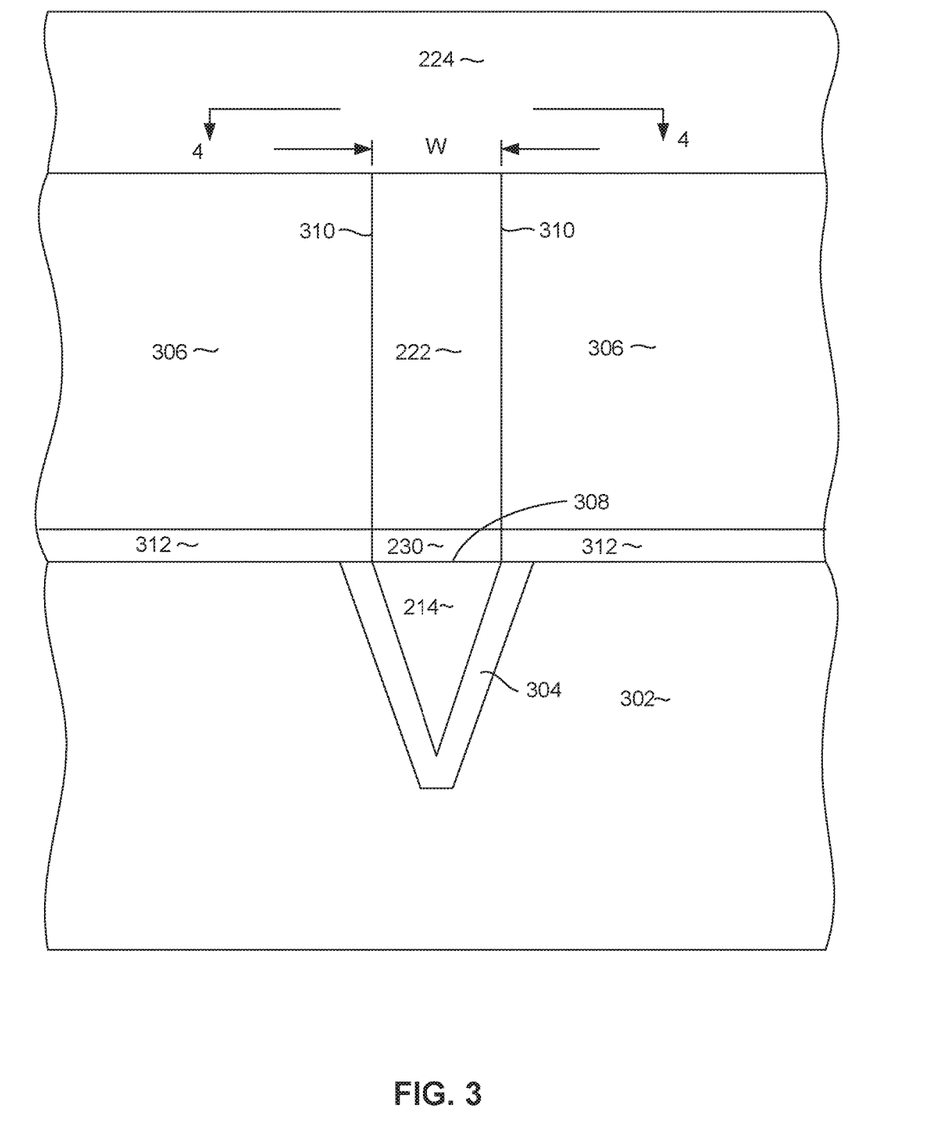
FIG. 3 is a is an enlarged view of a portion of the magnetic head of FIG. 2 as seen from the media facing surface.

This can be understood more clearly with reference to FIG. 3, which shows an enlarged view of the write pole 214 and surrounding structure as viewed from the media facing surface. As seen in FIG. 3 the write pole 214 can have a triangular (or trapezoidal) shape as viewed from the air bearing surface. A magnetic side shield structure 302 is formed at the sides of and below the write pole 214. The side shield structure 302 is separated from the sides of the write pole 214 by a non-magnetic side gap structure 304, In addition, an optional insulation layer 312 may be provided between the side shield structure 302 and the heat sink structure 306. The side gap structure 304 must be made of a material that is both non-magnetic and electrically insulating, such as alumina ($Al_2O_3$). Unfortunately, the magnetic material of the side shield structure 302 is not an ideal heat sink material, since such magnetic materials do not have as high a thermal conductivity as other more suitable materials such as Au. In addition, the side gap structure 304 (such as alumina) is an even worse conductor, so that it traps heat within the write pole 214.

Figure 4:
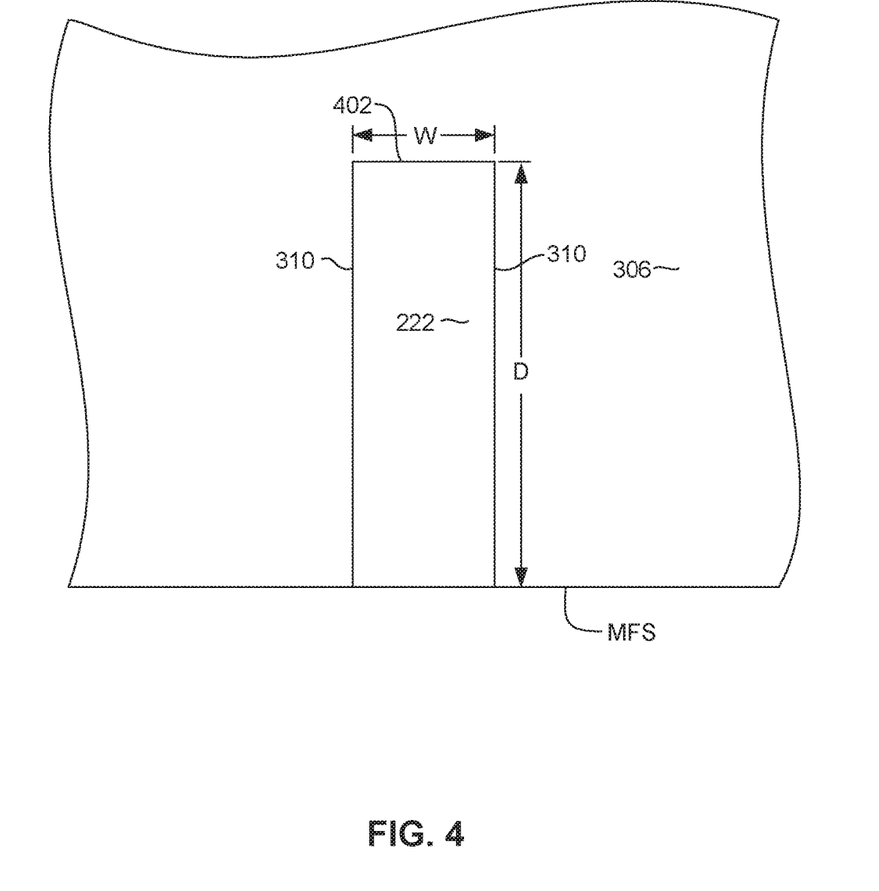
FIG. 4 is a top down sectional view as seen from line 4-4 of FIG. 3.

However, the structure shown in FIGS. 3 and 4 overcomes this problem by providing a novel heat sink structure that removes heat from the trailing magnetic shield 222, FIG. 3 is a view as seen from the media facing surface, and FIG. 4 is a top down view of the trailing shield 222 and surrounding heat sink structure 306 as seen from line 4-4 of FIG. 3. As seen in FIG. 3, the trailing shield 222 is narrow and tall, having a width W measure between first and second laterally opposed sides 310 that is substantially aligned with the width of the trailing edge 308 of the write pole 214 and substantially aligned with the spin torque oscillator 230. However, the trailing shield 222 need not be precisely aligned with the trailing edge 308 of the write pole 214 and spin torque oscillator 230. The heat sink structure 306 extends laterally from each side 310 of the trailing magnetic shield 222, and preferably physically contacts the sides of the trailing magnetic shield 222. In FIG. 4 it can be seen that the trailing magnetic shield 222 has a back edge 402 that is opposite the media facing surface MFS. The trailing magnetic shield has a depth D that is defined by the distance between the media facing surface MFS and the back edge 402. Preferably, the depth D is significantly larger than the width W.

As can be seen in FIG. 4, the heat sink structure 306 wraps around the magnetic trailing shield structure 222 so that it contacts the sides 310 as well as the back edge 402 of the magnetic trailing shield structure 222. The heat sink structure 306 is constructed of a material having a high thermal conductivity. The heat sink structure 306 preferably has a thermal conductivity of at least 4.0 E+08 pWum° C., and is preferably constructed of Au, which has excellent thermal conductivity on the order of 6.00 E+08 pW/um° C. Other suitable materials include Ru, an alloy of Au and another material, Cu or an alloy of Cu and another material, or Nitrides such as AlN.

Figure 12:
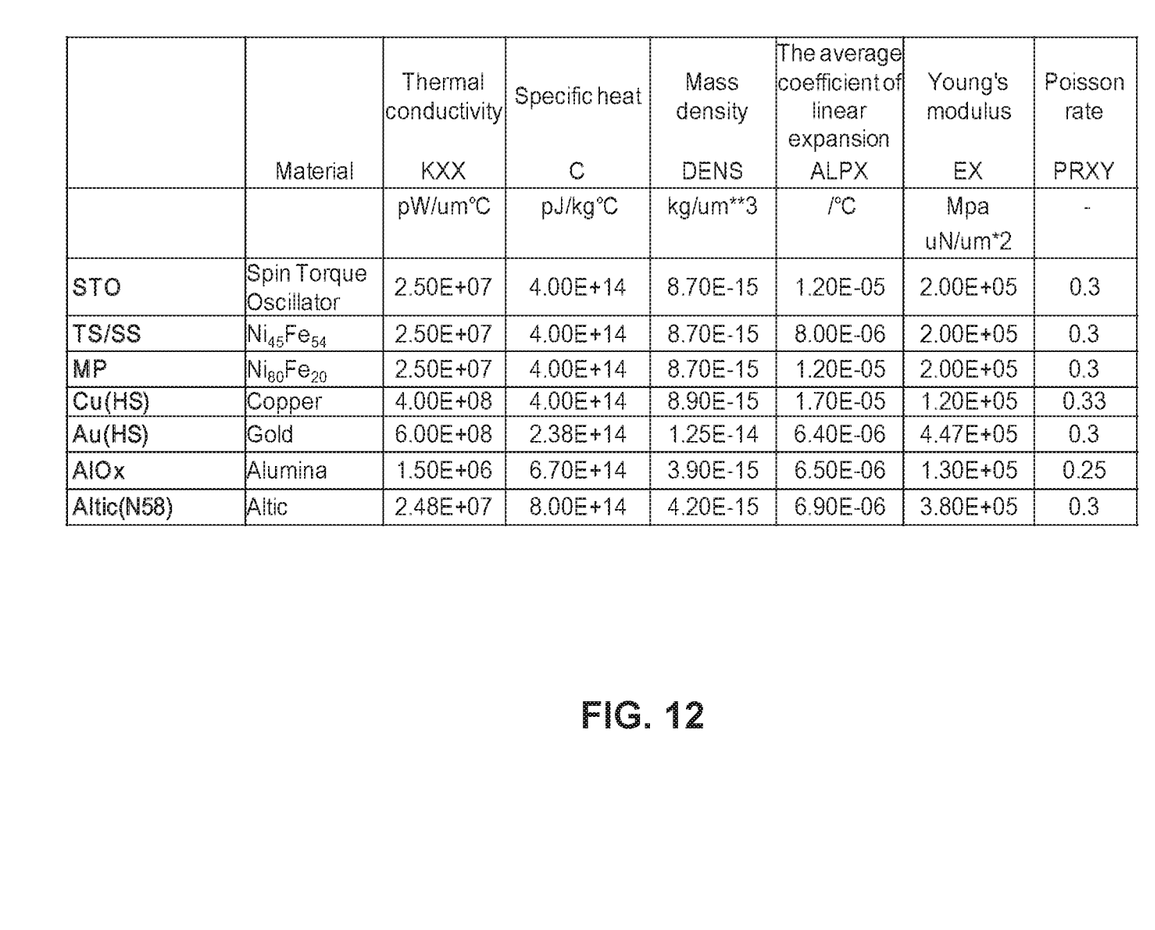
FIG. 12 is a table showing thermal properties of materials of various magnetic write head components.

FIG. 12 is a table that shows the thermal properties of Au and various other materials that can be used in a write head. In FIG. 12, the column labeled STO shows the thermal properties of a spin torque oscillator. The column labeled TS/SS shows the thermal properties of a trailing shield and side shield structure constructed of a $Ni_{45}Fe_{54}$ alloy. The column labeled MP shows the thermal properties of a main magnetic write pole constructed of $Ni_{80}Fe_{20}$ alloy. The column labeled Cu(HS) shows the thermal properties of a heat sink structure constructed of Cu, and the column labeled Au(HS) shows the thermal properties of a heat sink structure constructed of Au. The column labeled AlOx shows the thermal properties of aluminum oxide which could be used to form an insulation layer such as the side gap layer 304 of FIG. 3. The column labeled Altic (N58) shows the thermal properties of an aluminum titanium carbide material (AlTiC) that can be used as a slider body material. As can be seen, Au has a much higher thermal conductivity than any of the other materials making up the write head and has a significantly high thermal conductivity than even Cu. In addition, Au has a much lower specific heat density than any of the other materials. For this reason, the heat sink structure 306 (FIGS. 3 and 4) is preferably constructed of Au.

As discussed above with reference to FIGS. 3 and 4, the trailing magnetic shield 222 has sides 310 that are substantially aligned with the trailing edge 308 of the write pole 214 and also substantially aligned with the spin torque oscillator 230. This arrangement provides optimal heat transfer properties for removing heat from the write pole 214, spin torque oscillator 230 and trailing magnetic shield 222. However, the trailing shield does not necessarily have to have a width that aligns with the write pole 214 and spin torque oscillator 230. The trailing magnetic shield 222 could have a width that is substantially larger than the write pole 214 and spin torque oscillator. This would result in less than optimal thermal properties, but might be desirable for magnetic shielding performance purposes as a matter of design choice.

FIGS. 5a-11b show a magnetic write head in various intermediate stages of manufacture in order to illustrate a possible method for manufacturing a heat sink structure such as that described above. FIGS. 5a, 6a, 7a, 8a, 9a, 10a, and 11a are cross sectional side views. FIGS. 5b, 6b, 7b, 8b, 9b, 10b, and 11b are cross sectional views of a media facing surfing surface plane as indicated by the dashed line denoted MFS in FIG. 5a. As those skilled in the art will appreciate, the media facing surface plane is a location at which the media facing surface will be located once slicing and lapping operations have been performed for the finished magnetic head structure.

Figure 5A:
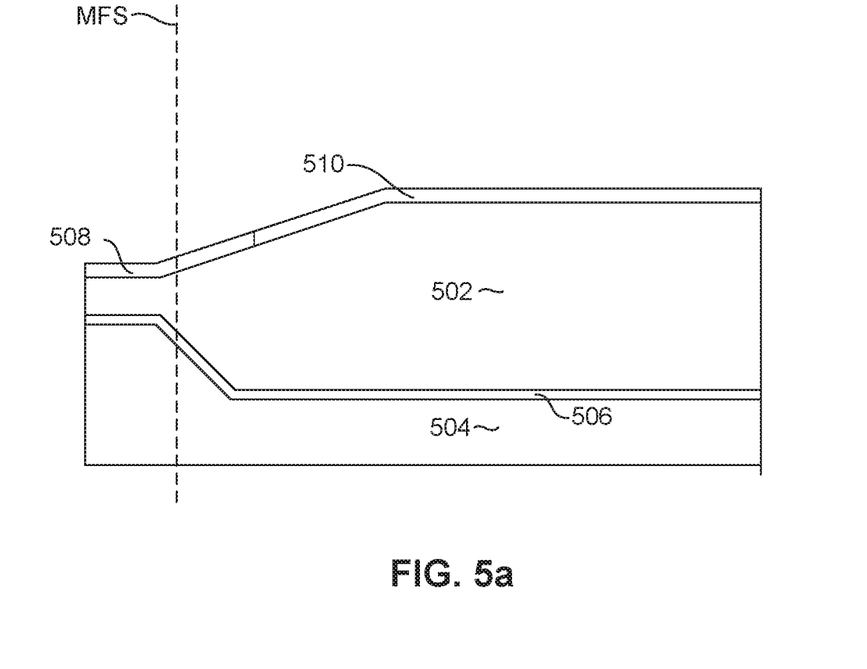
Figure 5B:
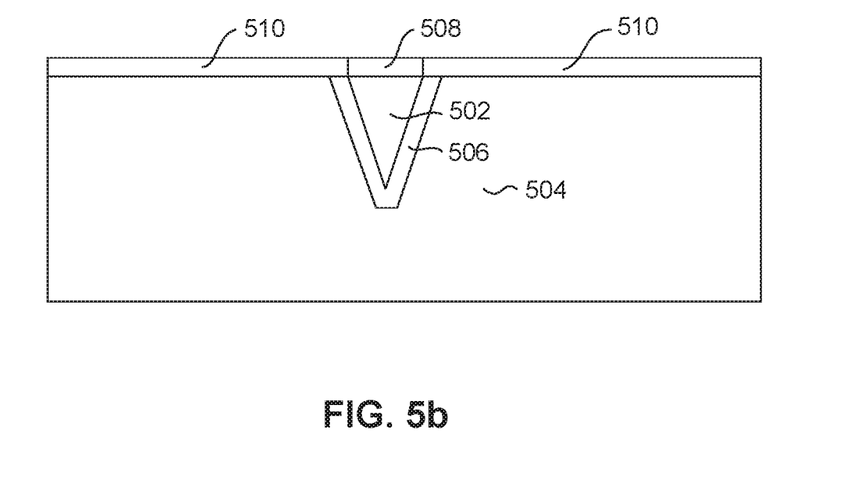

With reference to FIGS. 5a and 5b, a magnetic write pole 502 is formed. The write pole 502 can be constructed by a damascene process such that it is formed in a trench in a magnetic shield material 504 with a layer of non-magnetic, electrically insulating material 506 between the write pole 502 and the shield material 504. The write pole 502 can be formed with tapered leading and trailing edges as shown or without such tapers. A spin torque oscillator 508 can be formed over a portion of the write pole 502, and an insulating fill layer 510 can be formed over the write pole 502 and shield material 504 in areas surrounding the spin torque oscillator 508.

Figure 6A:
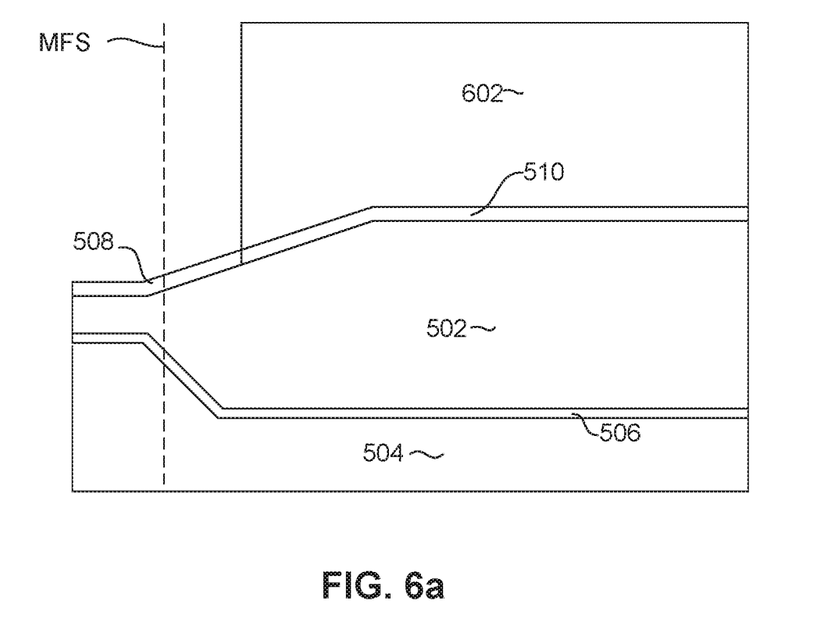
Figure 6B:
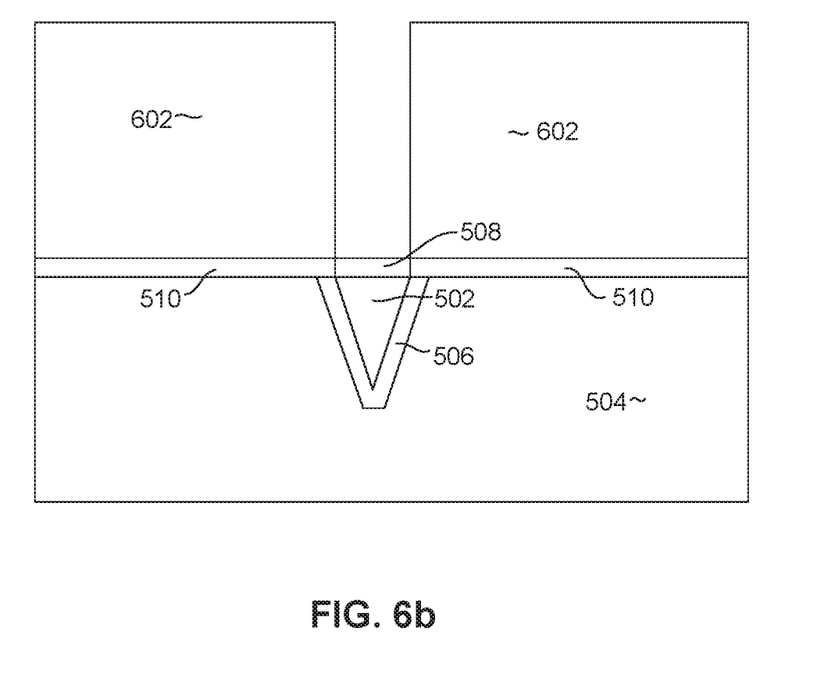

With reference now to FIGS. 6a and 6b, an electroplating frame mask 602 is formed over write pole 502 and insulation layer 510. The electroplating frame mask can be formed of a photolithographically patterned photoresist and is formed with an opening that is configured to define a trailing magnetic shield. As shown in FIGS. 6a and 6b, the opening in the mask 602 can be configured to substantially align with the spin torque oscillator, although exact alignment is not absolutely necessary, and some variation or deviation can be tolerated.

Figure 7A:
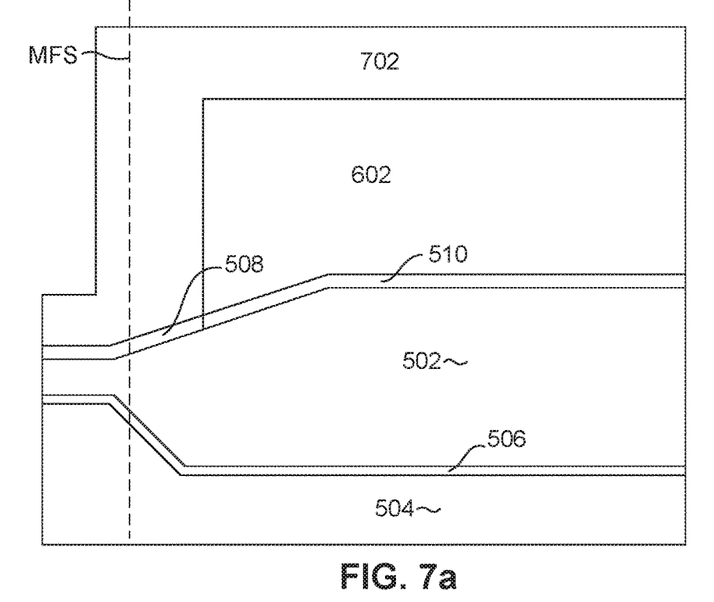
Figure 7B:
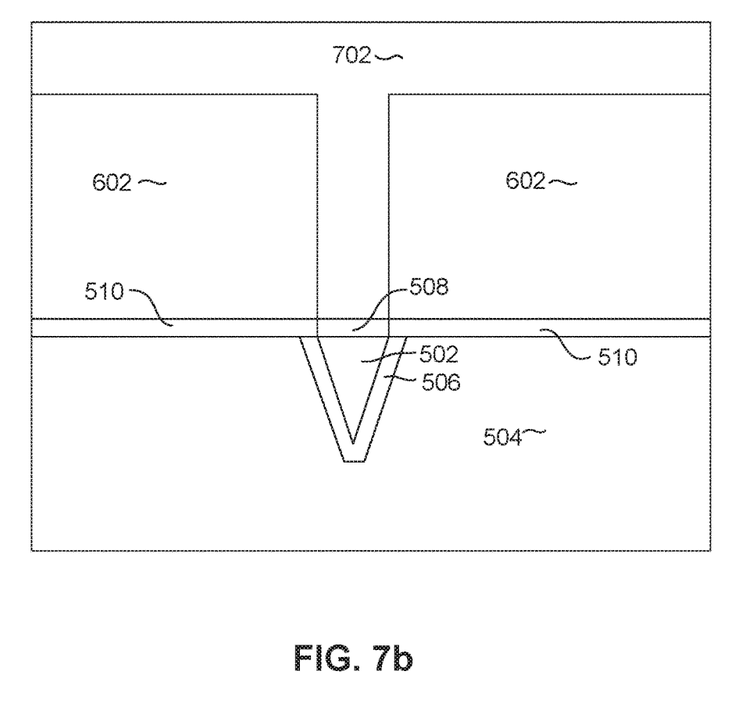
Figure 8A:
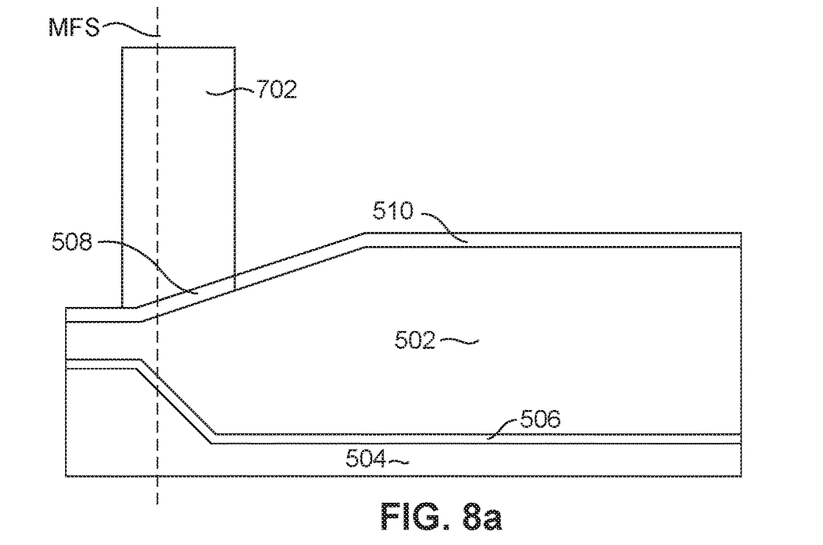
Figure 8B:
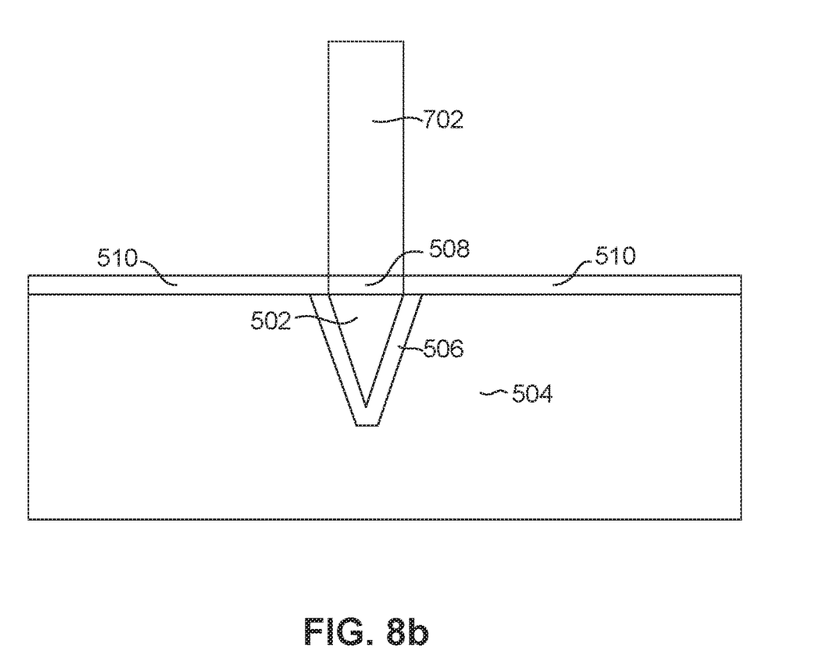
Figure 9A:
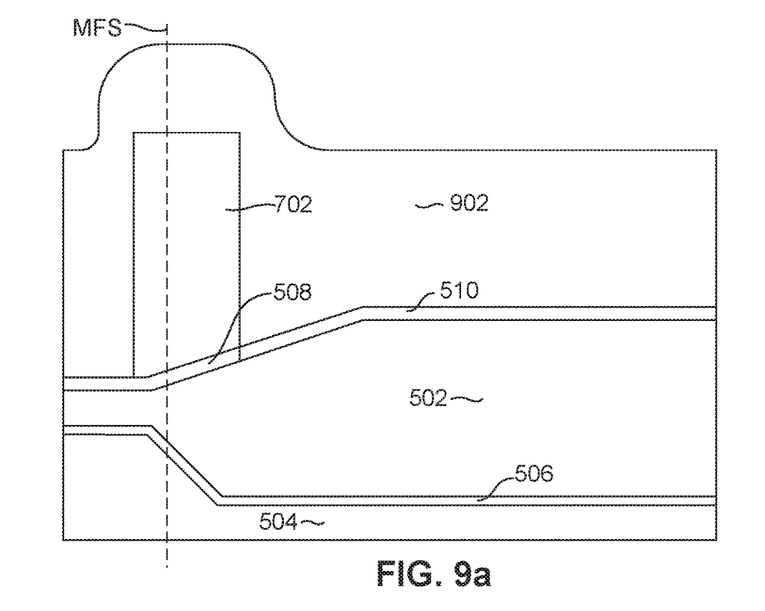
Figure 9B:
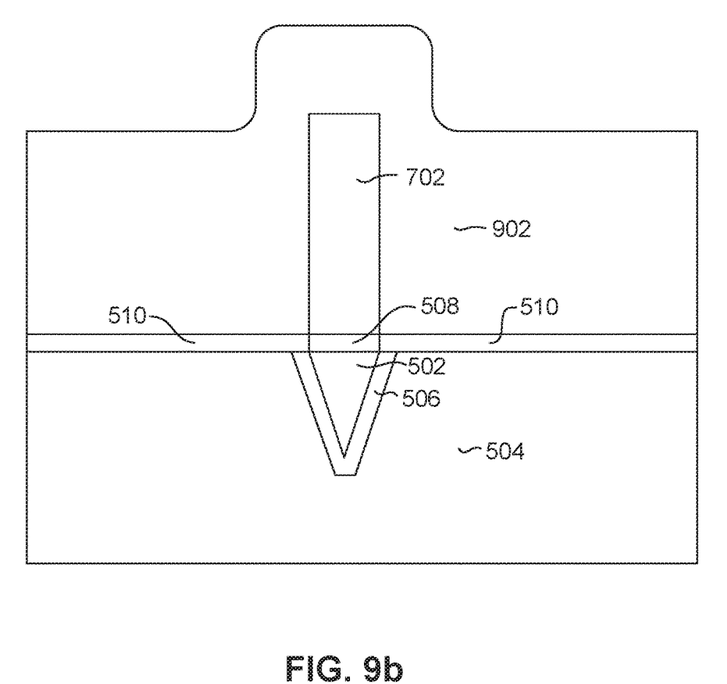
Figure 10A:
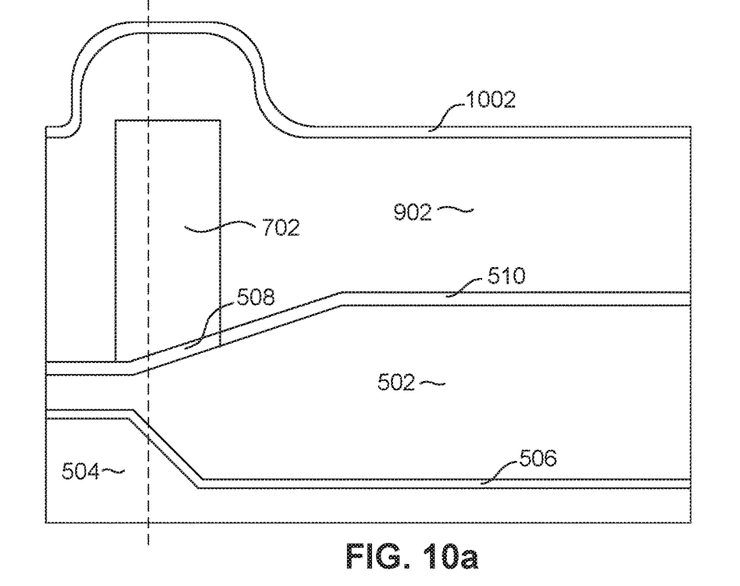
Figure 10B:
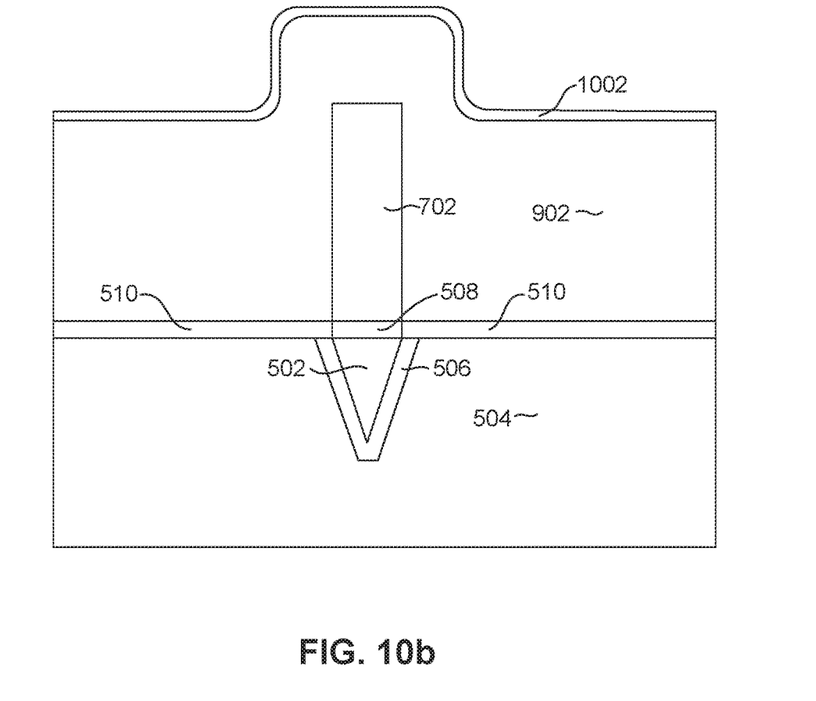

With reference now to FIGS. 7a and 7b, a magnetic material 702 is electroplated over the mask 602 and into the opening in the mask 602. The magnetic material 702 can be a Ni—Fe alloy, such as $Ni_{45}Fe_{54}$ so as to provide good magnetic properties for use as a magnetic shield. After electroplating, the mask 602 can be lifted off, leaving a structure as shown in FIGS. 8a and 8b. The mask liftoff process can be one or more of ion milling, chemical lift-off or $CO_2$ "snow". The lift-off of the mask leaves a columnar magnetic shield structure over the spin torque oscillator 508. Then, with reference to FIGS. 9a and 9b, a heat sink material (preferably Au) 902 is deposited. Then, with reference to FIGS. 10a and 10b, a chemical mechanical polish (CMP) stop layer 1002 is deposited over the heat sink material 902. The CMP stop layer 1002 is preferably Ru.

Figure 11A:
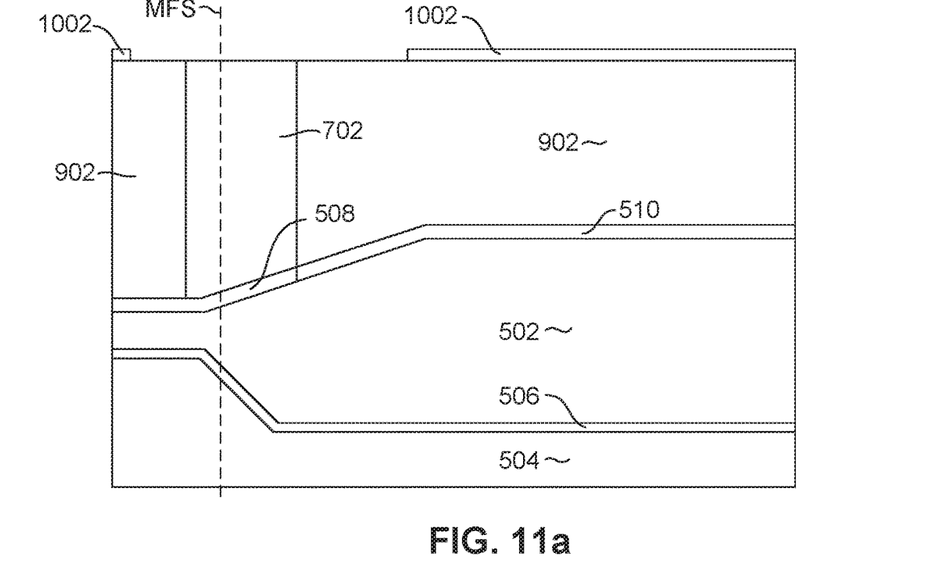
Figure 11B:
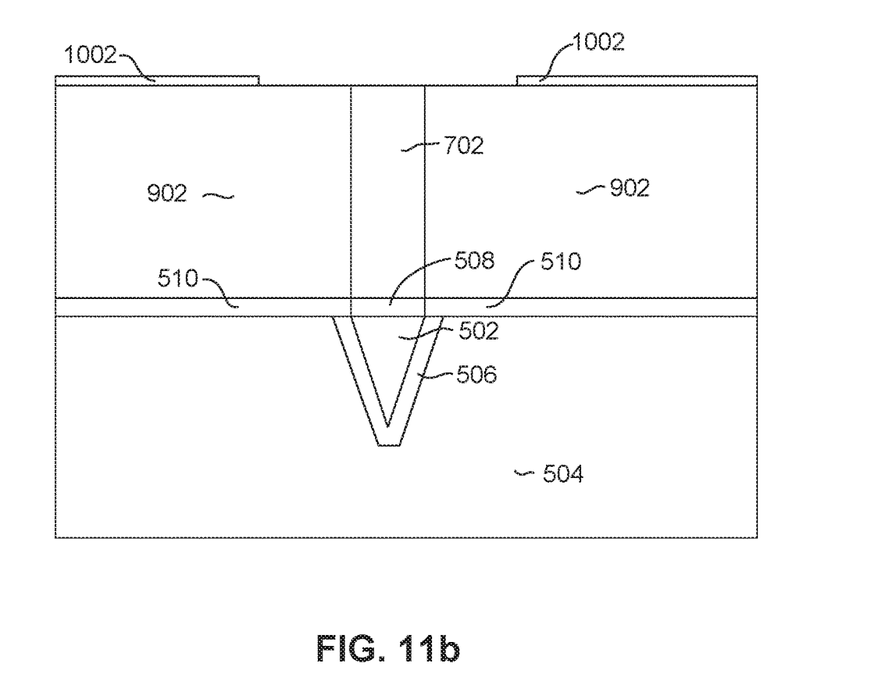

Then, a chemical mechanical polishing is performed, leaving a structure as shown in FIGS. 11a and 11b. The chemical mechanical polishing removes the raised portion of the heat sink material 902 and CMP stop layer 1002 over the shield, and exposes the top of the shield 702, but may leave some of the CMP stop material 1002 in the field region away from the shield 702, as shown in FIG. 11. The above processes, then, result in a magnetic shield 702 that is surrounded at its sides and back by an efficient heat sink material such as Au.

While various embodiments have been described above, it should be understood that they have been presented by way of example only and not limitation. Other embodiments falling within the scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic write head, comprising:
   a magnetic write pole;
   a trailing magnetic shield;
   a magnetic oscillator located between the magnetic write pole and the trailing magnetic shield; and
   a heat sink structure located adjacent to the trailing magnetic shield;
   wherein the trailing magnetic shield has first and second laterally opposed sides and a back side opposite a media facing surface, and wherein the heat sink structure contacts the first and second laterally opposed sides and the back side of the trailing magnetic shield so as to facilitate the conduction of heat between the trailing magnetic shield and the heat sink structure.

2. The magnetic write head as in claim 1, wherein the heat sink structure comprises a material having a thermal conductivity of at least 4.0 E+08 pWum° C.

3. The magnetic write head as in claim 1, wherein the heat sink structure comprises one or more of, Ru, TiN, Cu, Au, Ag and AlN.

4. The magnetic write head as in claim 1, wherein the heat sink structure comprises Au.

5. The magnetic write head as in claim 1, wherein the heat sink structure comprises Cu.

6. The magnetic write head as in claim 1, wherein the heat sink structure contacts the trailing magnetic shield.

7. The magnetic write head as in claim 1, wherein the heat sink structure wraps around the trailing magnetic shield.

8. The magnetic write head as in claim 1, wherein the trailing magnetic shield has a columnar structure that is substantially aligned with the magnetic oscillator.

9. A magnetic data recording system, comprising:
   a housing;
   a magnetic media held within the housing;
   an actuator;
   a slider connected with the actuator for movement adjacent to a surface of the magnetic media; and
   a magnetic write head formed on the slider, the magnetic write head further comprising:
   a magnetic write pole;
   a trailing magnetic shield;
   a magnetic oscillator located between the magnetic write pole and the trailing magnetic shield; and
   a non-magnetic heat sink structure located adjacent to the trailing magnetic shield;
   wherein the trailing magnetic shield has first and second laterally opposed sides and a back side opposite a media facing surface, and wherein the heat sink structure contacts the first and second laterally opposed sides and the back side of the trailing magnetic shield so as to facilitate the conduction of heat between the trailing magnetic shield and the heat sink structure.

10. The magnetic data recording system as in claim 9, wherein the heat sink structure comprises a material having a thermal conductivity of at least 4.0 E+08 pWum° C.

11. The magnetic data recording system as in claim 9, wherein the heat sink structure comprises one or more of, Ru, TiN, Cu, Au, Ag and AlN.

12. The magnetic data recording system as in claim 9, wherein the heat sink structure comprises Au.

13. The magnetic data recording system as in claim 9, wherein the heat sink structure comprises Cu.

14. The magnetic data recording system as in claim 9, wherein the heat sink structure wraps around the trailing magnetic shield.

15. The magnetic data recording system as in claim 9, wherein the trailing magnetic shield has a columnar structure that is substantially aligned with the magnetic oscillator.

16. A method for manufacturing a magnetic write head having a heat sink structure, comprising:
   forming a magnetic write pole;
   forming a magnetic oscillator on the magnetic write pole;
   forming a mask having an opening that is substantially aligned with the magnetic oscillator;
   electroplating a magnetic material into the opening in the mask to form a trailing magnetic shield having first and second laterally opposed sides and a back side opposite a media facing surface;
   removing the mask; and
   depositing a material having a high thermal conductivity to surround the magnetic trailing magnetic shield;
   wherein the deposited material having a high thermal conductivity contacts the first and second laterally opposed sides and the back side of the trailing magnetic shield so as to facilitate the conduction of heat between the trailing magnetic shield and the material having a high thermal conductivity.

17. The method as in claim 16 wherein the material having a high thermal conductivity comprises one or more of Ru, TiN, Cu, Au, Ag and AlN.

18. The method as in claim 16 further comprising, after depositing the material having a high thermal conductivity, performing a chemical mechanical polishing.

* * * * *